US012186871B2

(12) United States Patent
Ueda

(10) Patent No.: US 12,186,871 B2
(45) Date of Patent: Jan. 7, 2025

(54) DRIVING MACHINE

(71) Applicant: KOKI HOLDINGS CO., LTD., Tokyo (JP)

(72) Inventor: Takashi Ueda, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 0 days.

(21) Appl. No.: 18/448,550

(22) Filed: Aug. 11, 2023

(65) Prior Publication Data

US 2023/0381939 A1 Nov. 30, 2023

Related U.S. Application Data

(63) Continuation of application No. 17/199,801, filed on Mar. 12, 2021, now Pat. No. 11,724,378, which is a (Continued)

(30) Foreign Application Priority Data

May 27, 2015 (JP) ................................ 2015-107511

(51) Int. Cl.
*B25C 7/00* (2006.01)
*B25C 1/00* (2006.01)
(Continued)

(52) U.S. Cl.
CPC ................ *B25C 7/00* (2013.01); *B25C 1/008* (2013.01); *B25C 1/047* (2013.01); *B25C 1/06* (2013.01);
(Continued)

(58) Field of Classification Search
CPC .. B25C 1/04; B25C 1/06; B25C 1/047; B25C 1/008; B25D 9/08; B25D 11/125
See application file for complete search history.

(56) References Cited

U.S. PATENT DOCUMENTS 4,215,808 A 8/1980 Sollberger et al.
5,725,142 A 3/1998 Hamada
(Continued)

FOREIGN PATENT DOCUMENTS

JP 06-206177 A 7/1994
JP 09-314480 A 12/1997
(Continued)

OTHER PUBLICATIONS

U.S. PTO Non-Final Office Action issued in related parent U.S. Appl. No. 15/577,236, dated Nov. 20, 2019.
(Continued)

*Primary Examiner* — Nathaniel C Chukwurah
(74) *Attorney, Agent, or Firm* — Rimon P.C.

(57) ABSTRACT

There is provided a driving machine capable of reducing a load applied to a guide member in a direction of a center axis. The driving machine drives a fastener into a workpiece. The driving machine includes a movable piston, a driver blade operating together with the piston and applying driving force to the fastener, a cylinder guiding operation of the piston, a holder provided in a housing and supporting the cylinder, and a vibration damping rubber interposed between the holder and the housing and receiving a load applied to the holder in an operational direction of the piston.

25 Claims, 12 Drawing Sheets

11 : HOUSING
12 : CYLINDER
23 : HOLDER
133 : VIBRATION DAMPING RUBBER

Related U.S. Application Data continuation of application No. 17/100,221, filed on Nov. 20, 2020, now Pat. No. 10,946,506, which is a continuation of application No. 15/577,236, filed as application No. PCT/JP2016/064316 on May 13, 2016, now Pat. No. 10,875,166.

(51) Int. Cl.

| | |
|---|---|
| ***B25C 1/04*** | (2006.01) |
| ***B25C 1/06*** | (2006.01) |
| ***B25C 1/08*** | (2006.01) |
| ***B25F 5/00*** | (2006.01) |

(52) U.S. Cl.

CPC ................ *B25C 1/08* (2013.01); *B25F 5/006* (2013.01); *B25F 5/008* (2013.01)

(56) References Cited

U.S. PATENT DOCUMENTS

| | | | | |
|---|---|---|---|---|
| 5,911,351 | A * | 6/1999 | White ..................... | B25C 1/047 173/211 |
| 8,960,516 | B2 | 2/2015 | Iijima et al. | |
| 2002/0104869 | A1 | 8/2002 | Garvis et al. | |
| 2006/0076154 | A1 | 4/2006 | Aoki | |
| 2006/0180631 | A1 | 8/2006 | Pedicini et al. | |
| 2009/0090759 | A1 | 4/2009 | Leimbach et al. | |
| 2011/0073339 | A1 | 3/2011 | Werner et al. | |
| 2011/0198381 | A1 | 8/2011 | McCardle et al. | |
| 2012/0286014 | A1 | 11/2012 | Pedicini et al. | |
| 2014/0069671 | A1 | 3/2014 | Leimbach et al. | |
| 2015/0129630 | A1 | 5/2015 | Matsuno | |
| 2015/0202755 | A1 | 7/2015 | Tanji | |

FOREIGN PATENT DOCUMENTS

| | | |
|---|---|---|
| JP | 2011-011267 A | 1/2011 |
| JP | 2014-069289 A | 4/2014 |

OTHER PUBLICATIONS

U.S. PTO Final Office Action issued in related parent U.S. Appl. No. 15/577,236, dated Apr. 24, 2020.

U.S. PTO Notice of Allowance issued in related parent U.S. Appl. No. 15/577,236, dated Sep. 23, 2020.

Parent U.S. Appl. No. 15/577,236, filed Nov. 27, 2017.

Search Report issued in corresponding International Patent Application No. PCT/JP2016/064316, dated Jun. 21, 2016.

Notice of Allowance issued in related parent U.S. Appl. No. 17/199,801, mailed on Mar. 23, 2023.

U.S. PTO Notice of Allowance issued in related parent U.S. Appl. No. 17/100,221, dated Jan. 27, 2021.

Parent U.S. Appl. No. 17/100,221, filed Nov. 20, 2020.

U.S. PTO Notice of Allowance issued in related parent U.S. Appl. No. 17/199,801, dated Mar. 23, 2023.

* cited by examiner

11 : HOUSING
12 : CYLINDER
23 : HOLDER
133 : VIBRATION DAMPING RUBBER

DRIVING MACHINE

CROSS REFERENCES

This is a Continuation of U.S. patent application Ser. No. 17/199,801, filed Mar. 12, 2021, which is a Continuation of U.S. patent application Ser. No. 17/100,221, filed Nov. 20, 2020, now U.S. Pat. No. 10,946,506, issued Mar. 16, 2021, which is a Continuation of U.S. patent application Ser. No. 15/577,236, filed on Nov. 27, 2017, now U.S. Pat. No. 10,875,166, issued on Dec. 29, 2020, which is the U.S. National Phase under 35 U.S.C. § 371 of International Application No. PCT/JP2016/064316, filed on May 13, 2016, which claims the benefit of Japanese Application No. 2015-107511, filed on May 27, 2015, the entire contents of each are hereby incorporated by reference.

TECHNICAL FIELD

The present invention relates to a driving machine driving a fastener into a workpiece.

BACKGROUND ART

Patent Document 1 describes a driving machine driving a fastener into a workpiece. The driving machine described in Patent Document 1 includes a housing, a cylindrical guide member provided in the housing, a damper provided in the housing, a bellows disposed in the housing, and a piston serving as an operating member capable of operating along the guide member. A first end portion of the guide member in a direction of a center axis is connected to the housing. The bellows is extensible. The first end portion of the bellows is connected to the piston, and a second end portion of the bellows is fixed to the housing. Compressed air is sealed in the bellows, and thus, a compression chamber is formed. The housing includes a wall portion, and the damper is supported by the wall portion. The wall portion is extended in a radial direction of the guide member, and the wall portion is connected to the second end portion of the guide member in the direction of the center axis. A driver blade serving as a striker is fixed to the piston.

Also, the driving machine described in Patent Document 1 includes a motor provided in the housing, a gear transmitting rotary force of the motor to a cam, a protrusion provided on the cam, a locking portion provided on the piston, and the damper provided in the housing. Furthermore, the driving machine described in Patent Document 1 includes a push rod movable with respect to the housing, and a trigger operated by an operator.

When the motor is stopped, the piston is pressed against the damper by pressure of the compression chamber and is stopped at a bottom dead center. When the push rod is pressed against a workpiece and the trigger is operated, the cam is rotated by the rotary force of the motor, the protrusion is engaged with the locking portion, and the piston moves from the bottom dead center to a top dead center due to rotary force of the cam. During a period in which the piston moves from the bottom dead center to the top dead center, the bellows is compressed, and pressure in the compression chamber rises. When the piston reaches the top dead center, the protrusion separates from the locking portion, and the rotary force of the cam is not transmitted to the piston. Therefore, the piston moves from the top dead center to the bottom dead center by the pressure of the compression chamber. As a result, the driver blade drives the fastener into the workpiece. When the piston collides with the damper, the damper reduces and attenuates an impact load. Furthermore, the motor stops after the driver blade drives the fastener into the workpiece, and the piston stops in a state where the piston is in contact with the damper.

RELATED ART DOCUMENT

Patent Document

Patent Document 1: Japanese Patent Application Laid-Open Publication No. 2014-69289

SUMMARY OF THE INVENTION

Problems to be Solved by the Invention

However, in the driving machine described in Patent Document 1, there is a problem that a load received by the damper is transmitted to the guide member via the wall portion and the guide member receives a load in the direction of the center axis.

An object of the present invention is to provide a driving machine capable of reducing a load applied to a guide member in the direction of the center axis.

Means for Solving the Problems

An invention of one embodiment is a driving machine driving a fastener into a workpiece, and the driving machine includes a striker applying a driving force to the fastener, an operating member being operable together with the striker and provided in a housing, a guide member guiding operation of the operating member, a holder provided in the housing and supporting the guide member, and a first buffer interposed between the holder and the housing, and receiving a load applied to the holder in an operational direction of the operating member.

Effects of the Invention

According to one embodiment of the present invention, a load applied to the guide member in the direction of the center axis can be reduced.

BRIEF DESCRIPTIONS OF THE DRAWINGS

DETAILED DESCRIPTION OF PREFERRED EMBODIMENTS

Figure 1:
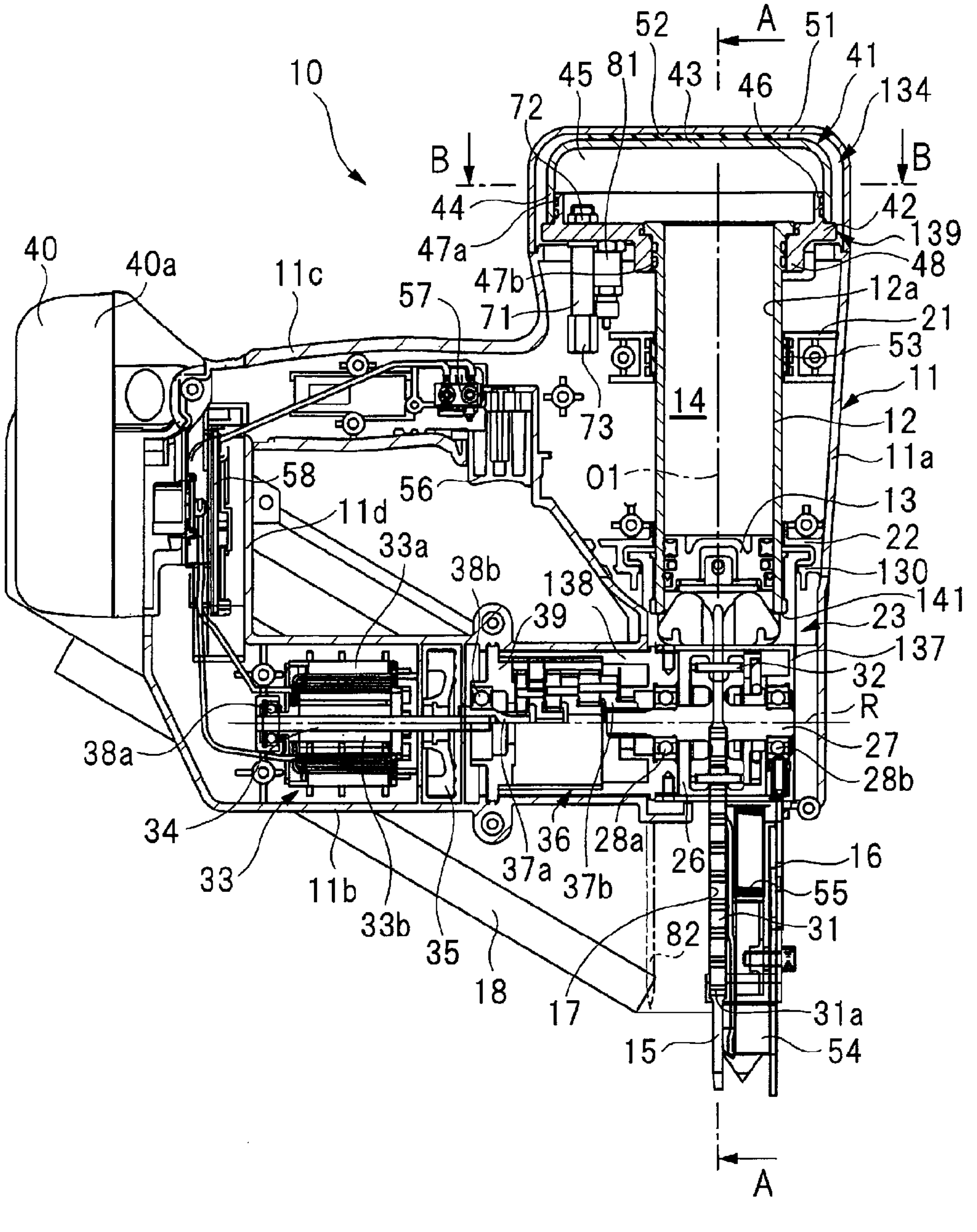
FIG. 1 is a side cross-sectional view of a driving machine according to an embodiment of the present invention, in a state in which a driver blade protrudes.

Hereinafter, an embodiment of the present invention will be described in detail with reference to the drawings. Throughout the drawings, the same members are denoted by the same reference characters.

A driving machine 10 illustrated in FIGS. 1 to 5 includes a housing 11. The housing 11 includes a cylinder case portion 11*a* accommodating a cylinder 12, and a motor case portion 11*b* integrated with a front end portion of the cylinder case portion 11*a*. A handle portion 11*c* is integrated with a top portion of the cylinder case portion 11*a* along the motor case portion 11*b*. A connecting portion 11*d* is integrally provided between a front end portion of the handle portion 11*c* and a front end portion of the motor case portion lib. As described above, the housing 11 includes the cylinder case portion 11*a*, the motor case portion 11*b*, the handle portion 11*c*, and the connecting portion 11*d*. The housing 11 includes two housing halves, and the housing 11 is assembled by fixing the two housing halves to each other. The two housing halves are separately formed of synthetic resin such as nylon or polycarbonate.

Figure 7:
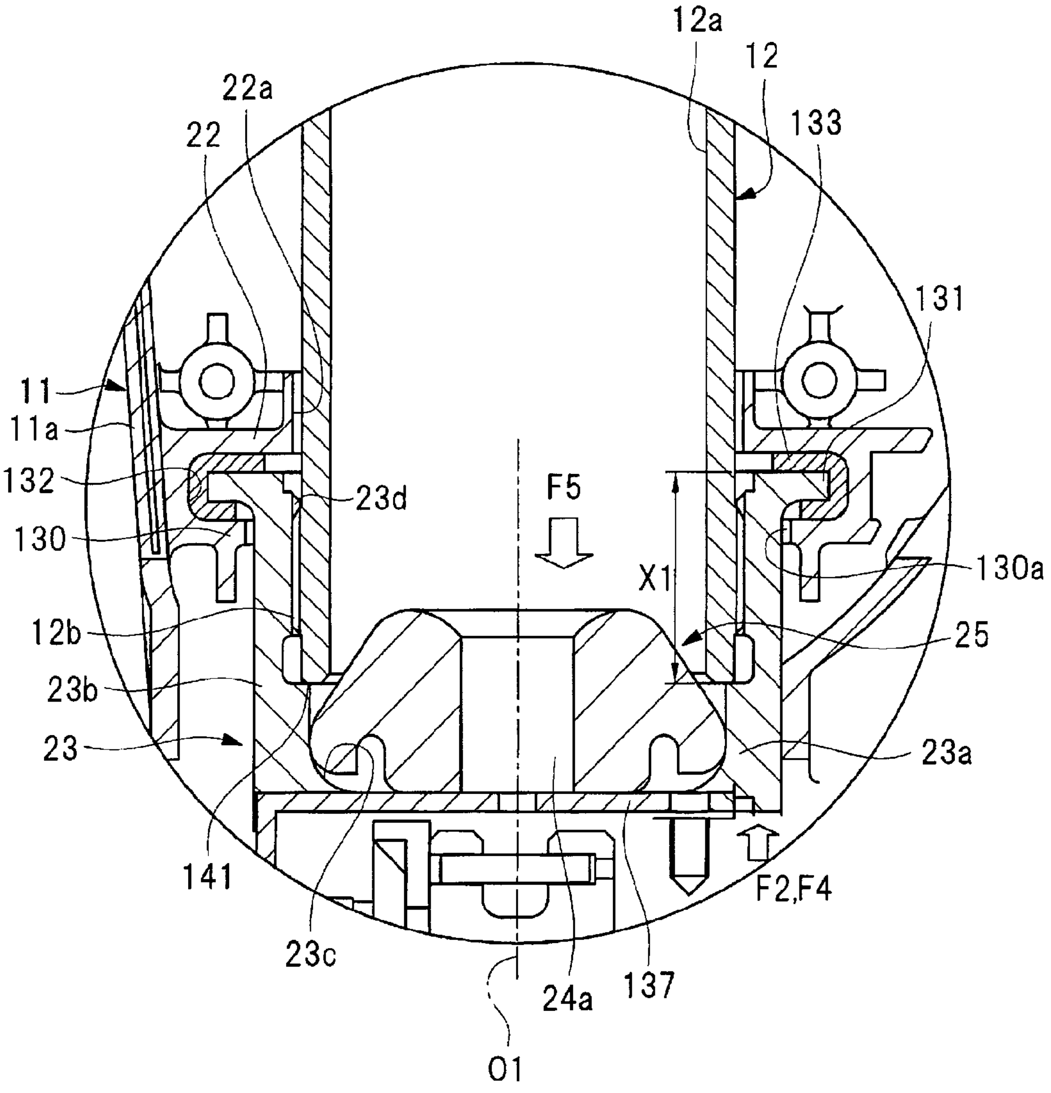
FIG. 7 is a cross-sectional view of a support structure of a holder provided in the driving machine illustrated in FIG. 1.
Figure 8:
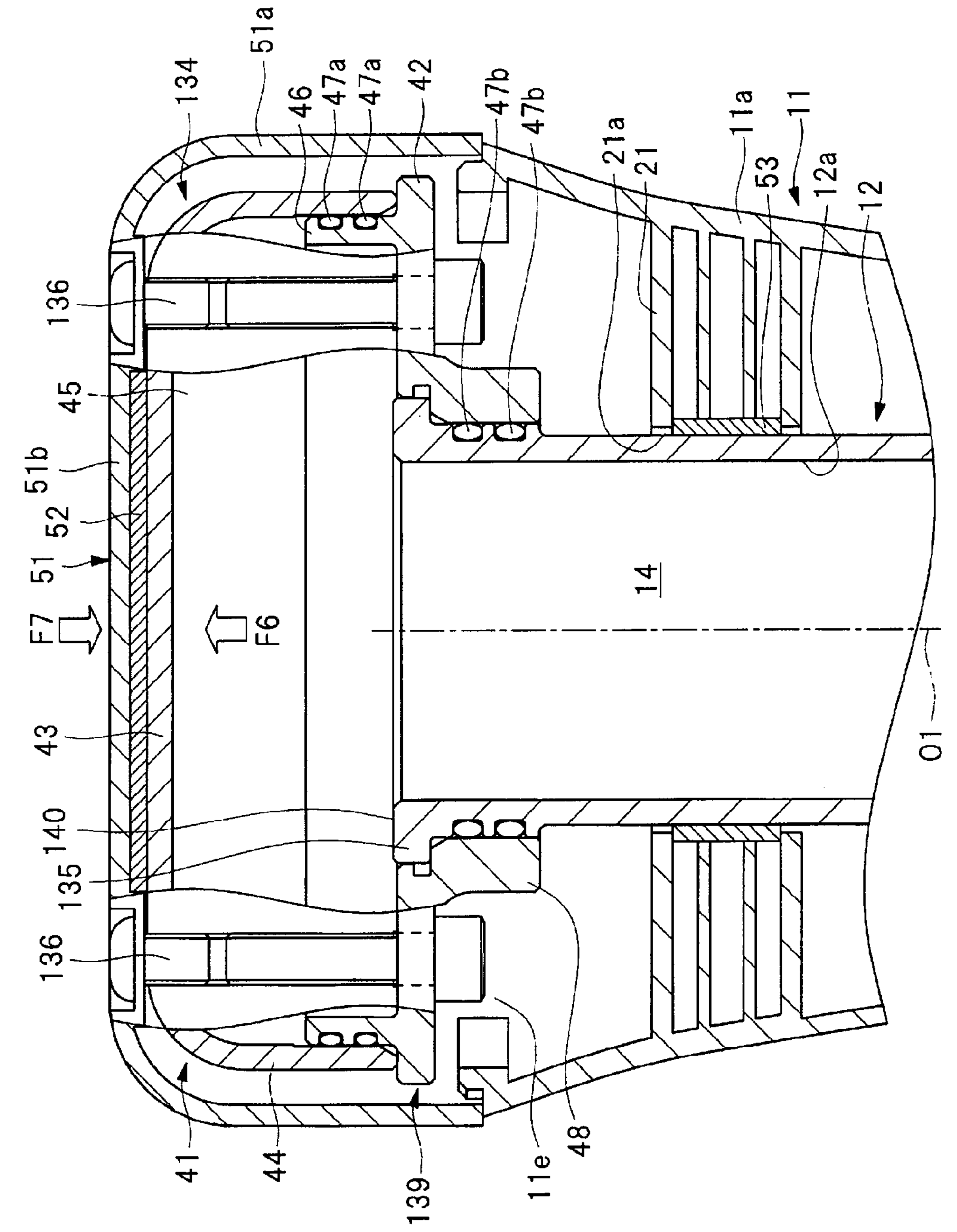
FIG. 8 is an enlarged cross-sectional view of an accumulator provided in the driving machine illustrated in FIG. 1.

A cylindrical cylinder 12 is accommodated in the cylinder case portion 11*a*, and the cylinder 12 has a cylinder hole 12*a*. A piston 13 is provided movably in the cylinder hole 12*a*. An operational direction of the piston 13 is a direction of a center axis O1 of the cylinder 12. The cylinder 12 is integrally formed of a metal material such as aluminum. Assuming that an upper end of the cylinder 12 illustrated in FIG. 8 is a top portion 140 and a lower end of the cylinder 12 illustrated in FIG. 7 is a front end portion 141, the piston 13 can reciprocate between the front end portion 141 and the top portion 140 of the cylinder 12. The top portion 140 and the front end portion 141 of the cylinder 12 are located farthest from each other in the direction of the center axis O1 of the cylinder 12. The direction of the center axis O1 is a direction parallel to the center axis O1, that is, the direction along the center axis O1.

A piston chamber 14 is formed by a top surface of the piston 13. A driver blade 15 is connected to the piston 13. A nose portion 16 is provided in the cylinder case portion 11*a* of the housing 11. An ejection port 17 is provided in the nose portion 16. The driver blade 15 is supported so as to be capable of reciprocating in the direction of the center axis O1 within the ejection port 17. The driver blade 15 is disposed so as to extend from the inside of the cylinder case portion 11*a* through the ejection port 17 to the outside of the housing 11.

A magazine 18 accommodating a large number of fasteners 82 is attached to the housing 11. The fasteners 82 in the magazine 18 are supplied one by one to the ejection port 17. The driver blade 15 applies driving force to the fastener 82 supplied to the ejection port 17, and drives the fastener 82 into a workpiece such as wood or a gypsum board. An operator holds the handle portion 11*c* when driving the fastener 82 and makes the center axis O1 of the cylinder 12 perpendicular to a surface of the workpiece.

Figure 2:
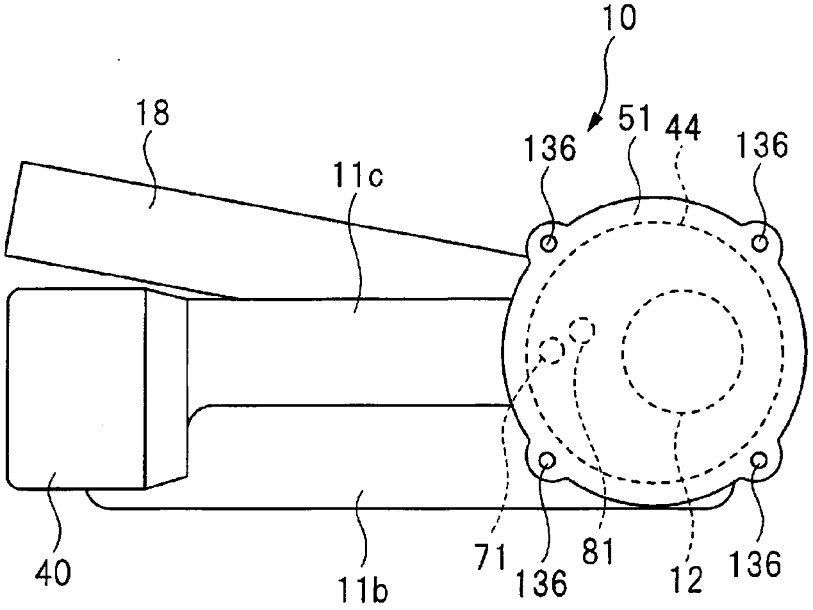
FIG. 2 is a plan view of the driving machine illustrated in FIG. 1.

As illustrated in FIG. 2, the motor case portion 11*b* is disposed so as to be shifted to one side in a width direction of the driving machine 10 with respect to the handle portion 11*c*, and the magazine 18 is disposed so as to be inclined on an opposite side in the width direction with respect to the motor case portion 11*b*. As illustrated in FIG. 1, the magazine 18 is inclined downward from a rear end portion toward a front end portion. However, the magazine 18 may be disposed at a right angle to the cylinder 12.

As illustrated in FIGS. 3, 4, 6, 7, and 8, protruding portions 21, 22, and 130 protruding from an inner surface of the cylinder case portion 11*a* are provided. The protruding portions 21, 22, and 130 are disposed at intervals in the direction of the center axis O1. The protruding portions 22 and 130 are disposed between the protruding portion 21 and the nose portion 16 in the direction of the center axis O1. The protruding portion 130 is disposed between the protruding portion 22 and the nose portion 16 in the direction of the center axis O1. Each of the protruding portions 21, 22, and 130 has an annular shape and is disposed in the cylinder case portion 11*a*. The protruding portion 21 forms a support hole 21*a*, the protruding portion 22 forms a support hole 22*a*, and the protruding portion 130 forms a support hole 130*a*. The support holes 21*a*, 22*a*, and 130*a* are concentrically arranged, and part of the cylinder 12 in the direction of the center axis O1 is disposed in the support holes 21*a*, 22*a*, and 130*a*. An inner diameter of the support hole 130*a* is greater than an inner diameter of the support hole 22*a*. In addition, a support groove 132 is provided between the protruding portion 22 and the protruding portion 130. The support groove 132 is annular.

Figure 3:
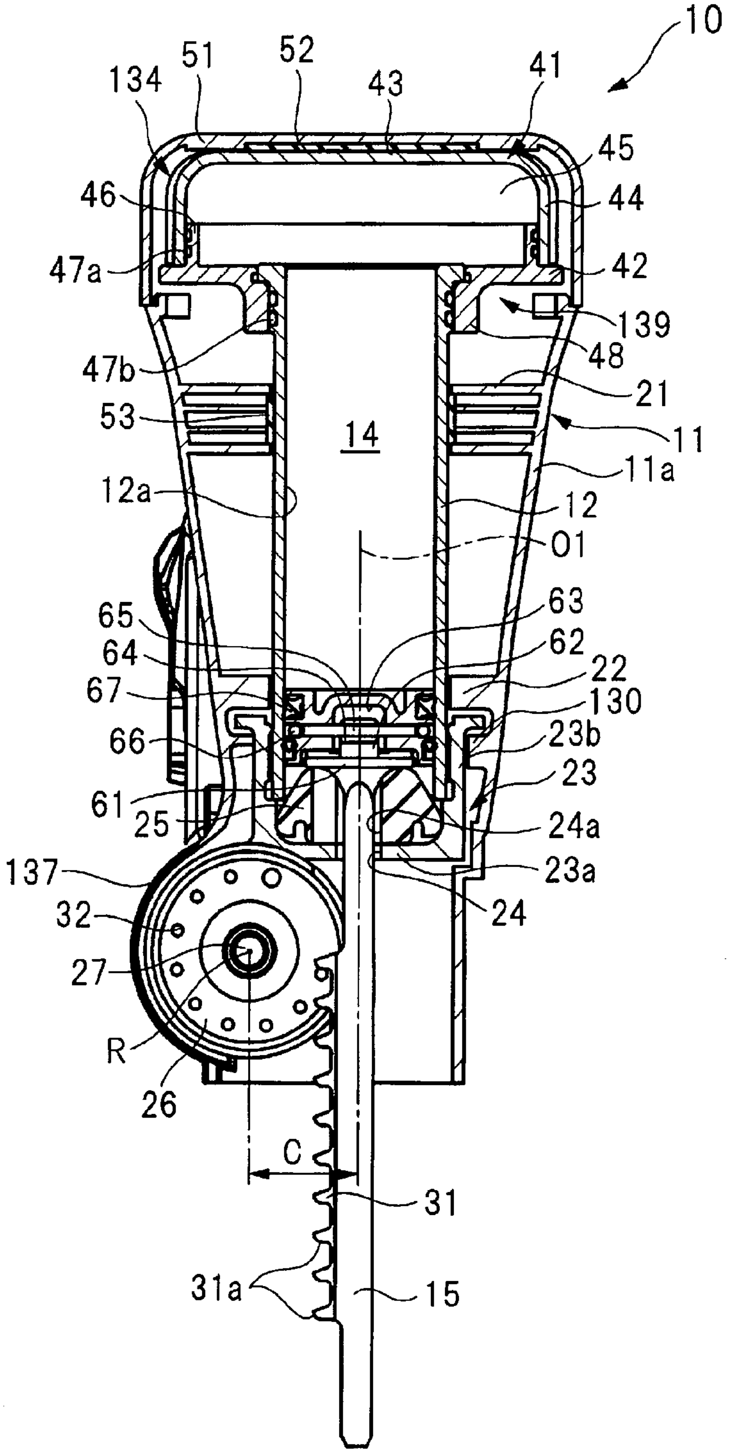
FIG. 3 is a front cross-sectional view taken along a line A-A of the driving machine illustrated in FIG. 1.
Figure 4:
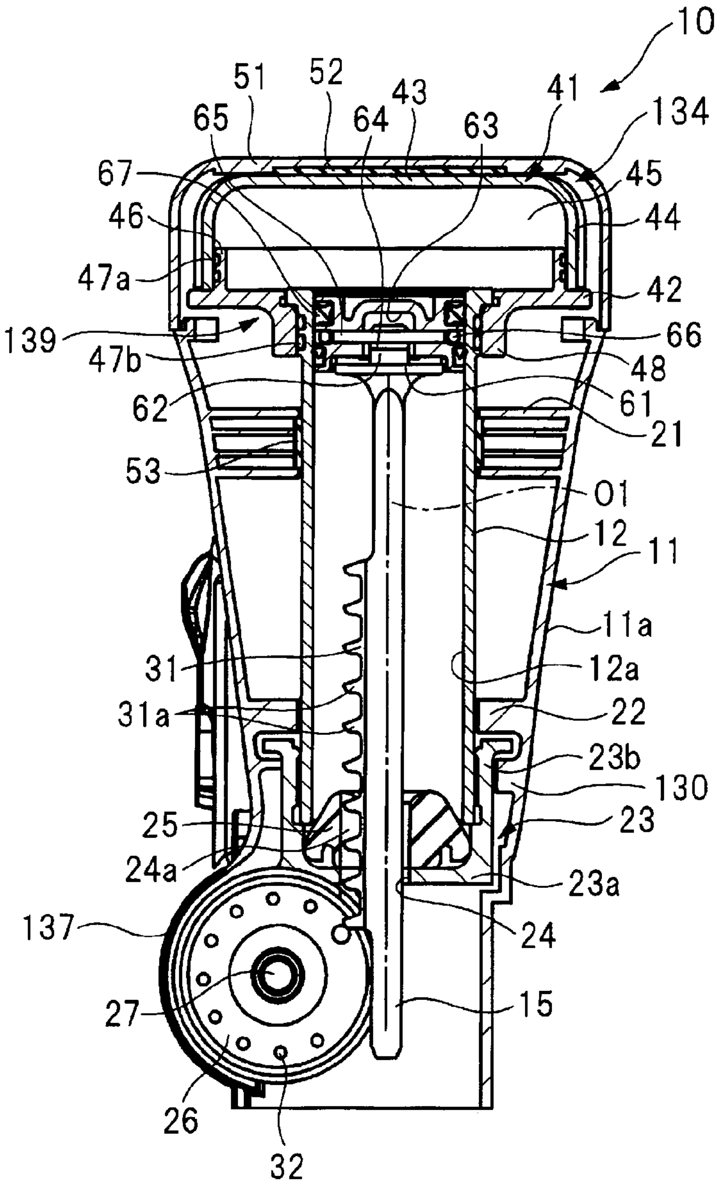
FIG. 4 is a front cross-sectional view illustrating a state in which a driver blade of the driving machine illustrated in FIG. 1 is retracted.

As illustrated in FIGS. 3, 4, and 7, in the cylinder case portion 11*a*, a holder 23 is provided at a location including the front end portion 141 of the cylinder 12 in the direction of the center axis O1. The holder 23 is connected to the nose portion 16, and the cylinder 12 is connected to the holder 23. The location where the holder 23 is connected to the cylinder 12 is an end portion of the cylinder 12 closer to the nose portion 16. The holder 23 includes an end wall portion 23*a* and a cylindrical portion 23*b*. An inner diameter of the cylindrical portion 23*b* is greater than an outer diameter of the cylinder 12, and the end wall portion 23*a* has a through hole 24. The driver blade 15 is disposed so as to be movable into the through hole 24.

The holder 23 is disposed between the protruding portion 22 and the nose portion 16 in the direction of the center axis O1. A male thread 12*b* is formed on an outer peripheral surface of the cylinder 12, and a female thread 23*d* is formed on an inner peripheral surface of the cylindrical portion 23*b*. The cylinder 12 and the holder 23 are screw-coupled and fixed to each other in the direction of the center axis O1. In the direction of the center axis O1, a region where the cylinder 12 is disposed overlaps with a region where the holder 23 is disposed, and thus, an overlapping portion X1 is formed. The cylinder 12 and the holder 23 are screw-coupled to each other at the overlapping portion X1.

A flange 131 protruding outward in the radial direction is provided on the outer peripheral surface of the cylindrical portion 23*b*. The flange 131 has an annular shape, and the flange 131 is disposed in the support groove 132. An outer diameter of the flange 131 is greater than the inner diameter of each of the support holes 22*a* and 130*a*. A vibration damping rubber 133 is disposed in the support groove 132.

The vibration damping rubber 133 is annular and has a U-shaped cross section. The vibration damping rubber 133 covers the flange 131 over the entire circumference. The vibration damping rubber 133 is interposed between the flange 131, and the protruding portions 22 and 130. The flange 131 is engaged with the protruding portions 22 and 130 in the direction of the center axis O1 via the vibration damping rubber 133. That is, the holder 23 is positioned in the direction of the center axis O1 by the protruding portions 22 and 130. In addition, the holder 23 is positioned in the radial direction by an inner surface of the support groove 132.

FIGS. 1 and 3 illustrate a state where the driver blade 15 is driven out by the piston 13 and the piston 13 is in an advanced position. The advanced position is a bottom dead center at which the piston 13 is pressed against the damper 25. FIG. 4 illustrates a state where the piston 13 is pushed by the driver blade 15 and the piston 13 is in a retracted position. The retracted position is a top dead center where the piston 13 is most distant from the damper 25. A recess 23*c* is provided in the end wall portion 23*a*, and the damper 25 is disposed in the recess 23*c*. The damper 25 is integrally formed of a rubber-like elastic body or urethane, and a region where the damper 25 is disposed includes a location where the front end portion 141 is disposed in the direction of the center axis O1. When the piston 13 operates and a flange 61 of the driver blade 15 collides with the damper 25, the damper 25 attenuates and reduces an impact load.

A rotary disc 26 is provided for moving the piston 13 to the retracted position illustrated in FIG. 4. A cylindrical accommodating portion 137 is provided in the cylinder case portion 11*a*, and the rotary disc 26 is accommodated in the accommodating portion 137. The accommodating portion 137 is continuously integrally formed with the holder 23. The rotary disc 26 is provided on a drive shaft 27. As illustrated in FIG. 1, the drive shaft 27 is rotatably supported by bearings 28*a* and 28*b* attached to the motor case portion 11*b*. A rack 31 including a plurality of rack claws 31*a* is attached to the driver blade 15, and a plurality of pins 32 engaged with and disengaged from the rack claws 31*a* are attached to the rotary disc 26 at intervals in a circumferential direction.

As illustrated in FIGS. 1 and 3, a rotation center axis R of the rotary disc 26 is shifted in a radial direction of the cylinder 12 by a distance C with respect to the center axis O1 of the cylinder 12, and is substantially at a right angle with respect to the center axis O1. In FIG. 1, a cross section of a portion around the rotation center axis R and a cross section of a portion around the center axis O1 are illustrated. The center axis O1 is a virtual line, a center line, or an axis defined from the viewpoint of mechanical engineering, and the center axis O1 does not exist as an object.

In order to rotate the rotary disc 26, an electric motor 33 is provided in the motor case portion 11*b*. The electric motor 33 includes a stator 33*a* fixed to the motor case portion 11*b*, and a rotor 33*b* rotatably provided in the stator 33*a*. A cooling fan 35 is attached to a motor shaft 34 provided on the rotor 33*b*, and cooling air for cooling the electric motor 33 is generated in the housing 11 by the cooling fan 35. The housing 11 is provided with an intake hole, not illustrated, for introducing outside air, and a discharge hole, not illustrated, for discharging air which has cooled the motor.

A planetary reduction gear 36 is provided in the motor case portion 11*b*. An input shaft 37*a* of the reduction gear 36 is connected to the motor shaft 34, and an output shaft 37*b* of the reduction gear 36 is connected to the drive shaft 27. The motor shaft 34 is rotatably supported by a bearing 38*a* attached to the motor case portion 11*b*. The motor shaft 34 is connected to the input shaft 37*a*, and a reduction gear holder 39 is provided in the motor case portion 11*b*. A bearing 38*b* is provided in the reduction gear holder 39. The input shaft 37*a* is rotatably supported by the bearing 38*b*. A gear case 138 is provided in the motor case portion 11*b*, and the reduction gear 36 is accommodated in the gear case 138. The gear case 138 is fixed to the holder 23 with a fixing element.

A battery 40 is attached to the connecting portion 11*d*. The battery 40 can be attached to and detached from the connecting portion 11*d*, and the battery 40 supplies power to the electric motor 33. The battery 40 includes an accommodation case 40*a*, and a plurality of battery cells accommodated in the accommodation case 40*a*. The battery cell is a secondary battery such as a lithium-ion battery, a nickel-metal hydride battery, a lithium-ion polymer battery, a nickel-cadmium battery, or the like.

As illustrated in FIG. 8, an accumulator 41 is provided outside the cylinder 12 in the direction of the center axis O1 of the cylinder 12. The cylinder case portion 11*a* includes an opening 11*e*, and the top portion 140 of the cylinder 12 in the direction of the center axis O1 is disposed outside the cylinder case portion 11*a* through the opening 11*e*. The accumulator 41 includes a main body 134 and a holder 139. Both the main body 134 and the holder 139 are formed of a metal material. The main body 134 includes a cylindrical portion 44 and a top wall portion 43 continuous with the cylindrical portion 44. The holder 139 includes an annular bottom wall portion 42, a protruding portion 46 extending from the bottom wall portion 42 in the direction of the center axis O1, and a protruding portion 48 extending from the bottom wall portion 42 in the direction of the center axis O1. An outer diameter of the protruding portion 46 is smaller than an inner diameter of the cylindrical portion 44, and the protruding portion 46 is disposed in the cylindrical portion 44. In addition, the protruding portion 48 and the protruding portion 46 extend from the bottom wall portion 42 in opposite directions. An outer diameter of the protruding portion 48 is smaller than an inner diameter of the protruding portion 46.

Figure 5:
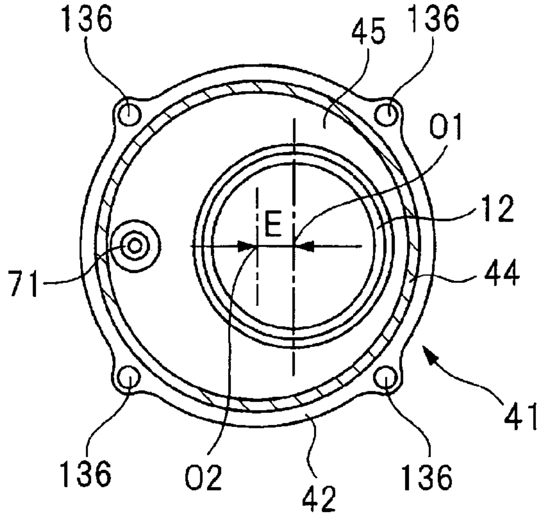
FIG. 5 is a plan cross-sectional view taken along a line B-B of the driving machine illustrated in FIG. 1.

The top wall portion 43 faces the top portion of the cylinder 12 and the bottom wall portion 42. A compression chamber 45 communicating with the piston chamber 14 is formed inside the accumulator 41. The top portion 140 forms an inner surface of the compression chamber 45. As illustrated in FIG. 5, the bottom wall portion 42 is an element having a circular outer peripheral surface. A center O2 of the bottom wall portion 42 is eccentric from the center axis O1 of the cylinder 12 toward the handle portion 11*c* by an amount E of eccentricity. The bottom wall portion 42 is shifted with respect to the cylinder 12 in the radial direction. Therefore, the compression chamber 45 of the accumulator 41 is eccentric with respect to the center axis O1 of the cylinder 12.

An outer diameter of the cylindrical portion 44 of the accumulator 41 is greater than the outer diameter of the cylinder 12. Therefore, compared with a case where the compression chamber 45 is formed within a projected area of the top portion 140 of the cylinder 12, a length of the driving machine 10 in the vertical direction including the cylinder 12 and the accumulator 41 can be made shorter. The projected area of the top portion 140 is an area of a circle formed by an outer peripheral edge of the top portion 140 on a plane perpendicular to the center axis O1. Thus, it is possible to downsize the driving machine 10.

As illustrated in FIG. 8, a seal member 47*a* is attached to an outer peripheral surface of the protruding portion 46. The seal member 47*a* hermetically seals the space between the cylindrical portion 44 and the protruding portion 46. A flange 135 is provided at an end portion of the cylinder 12 in the direction of the center axis O1, the end portion being located in the accumulator 41. The flange 135 protrudes radially outward from the outer peripheral surface of the cylinder 12. The flange 135 is annular, and an outer diameter of the flange 135 is greater than an inner diameter of the protruding portion 48. Therefore, when the flange 135 and the protruding portion 48 are engaged with each other, movement of the accumulator 41 with respect to the cylinder 12 in the direction of the center axis O1 is restricted. A seal member 47*b* is attached to the outer peripheral surface of the cylinder 12. The seal member 47*b* hermetically seals the space between the cylinder 12 and the protruding portion 48.

A cover 51 is provided for covering the opening 11*e* and the accumulator 41. The cover 51 is disposed outside the cylinder case portion 11*a*. The cover 51 includes a cylindrical portion 51*a* and a disc portion 51*b* continuous with the cylindrical portion 51*a*. The cover 51 is integrally formed of a synthetic resin or a metal material. An inner diameter of the cylindrical portion 51*a* is greater than an outer diameter of the accumulator 41. An end portion of the cylindrical portion 51*a* in the direction of the center axis O1 contacts the cylinder case portion 11*a*.

Furthermore, connecting elements 136 are provided for connecting the cover 51 and the accumulator 41. The connecting element 136 is a shaft member, and the connecting element 136 connects the bottom wall portion 42 and the disc portion 51*b*. In a state where the cover 51 and the accumulator 41 are connected by the connecting elements 136, the cover 51 can move within a predetermined range in the direction of the center axis O1 with respect to the accumulator 41. The plurality of connecting elements 136 are provided and disposed radially outside with respect to the cylindrical portion 44. Therefore, airtightness of the compression chamber 45 is not deteriorated by the connecting elements 136. Furthermore, a sheet-like vibration damping rubber 52 is interposed between the disc portion 51*b* and the top wall portion 43.

Furthermore, an annular vibration damping rubber 53 is disposed between the protruding portion 21 and the outer peripheral surface of the cylinder 12. An inner diameter of the support hole 21*a* is greater than the outer diameter of the cylinder 12, and the vibration damping rubber 53 is attached in the support hole 21*a*. The vibration damping rubber 53 prevents the cylinder 12 from vibrating in a direction crossing the center axis O1, for example, in the radial direction. Each of the vibration damping rubber 52, 53, and 133 is integrally formed of a soft material having rubber elasticity, for example, urethane or elastomer. The soft material means a material having rigidity lower than the rigidity of the metal forming the cylinder 12.

Air is filled as a gas inside the piston chamber 14 and the compression chamber 45. Air is a compressible gas. As illustrated in FIG. 1, in a case where the piston 13 pressed against the damper 25 moves toward the compression chamber 45, the following control is performed. First, power of the electric motor 33 is transmitted to the rotary disc 26 via the reduction gear 36, and the rotary disc 26 rotates in the counterclockwise direction in FIG. 3. When the rotary disc 26 rotates, the pins 32 sequentially mesh with the rack claws 31*a*, and the piston 13 rises to an opening end of the cylinder 12, that is, the top dead center as illustrated in FIG. 4. In this manner, in a stroke in which the piston 13 rises, compressed air in the piston chamber 14 enters the compression chamber 45. When the piston 13 reaches the top dead center, pressure of the compressed air in the compression chamber 45 becomes maximum. After the piston 13 has reached the top dead center, the rotary disc 26 rotates, and the pin 32 and the rack claw 31*a* are disengaged from each other. Then, the piston 13 moves from the top dead center to the bottom dead center due to the pressure of the compressed air in the compression chamber 45. A rotation angle of the rotary disc 26 is detected by an angle detection sensor, not illustrated.

The nose portion 16 is provided with a push rod 54 such that the push rod 54 can freely reciprocate in the axial direction. The push rod 54 is also called a contact arm. A compression coil spring 55 for urging the push rod 54 is provided. The push rod 54 is pushed in the direction away from the damper by force of the compression coil spring 55, that is, in the downward direction in FIG. 1. When the push rod 54 abuts against the workpiece and the push rod 54 retracts against force of the compression coil spring 55, a pressing detection sensor, not illustrated, detects that the push rod 54 has been pressed against the workpiece. The handle portion 11*c* is provided with a trigger 56, and an operation state of the trigger 56 is detected by a trigger switch 57.

A controller 58 is provided in the housing 11. Detection signals from the angle detection sensor, the pressing detection sensor, and the trigger switch 57 described above are sent to the controller 58. The electric motor 33 rotates when the trigger 56 is operated in a state where the piston 13 is in the advanced position as illustrated in FIGS. 1 and 3, and when the push rod 54 abuts against the workpiece and the trigger switch 57 is turned on. A rotary force of the electric motor 33 is transmitted to the rotary disc 26 via the reduction gear 36, and the piston 13 moves to the retracted position. When the pin 32 is disengaged from the rack claw 31*a*, the piston 13 moves to the advanced position by compressed air in the compression chamber 45, and the driver blade 15 drives the fastener 82 into the workpiece.

As illustrated in FIGS. 3 and 4, a flange 61 contacting the damper 25 is provided at a base end portion of the driver blade 15. A connecting portion 62 protrudes upward from the flange 61. When the flange 61 collides with the damper 25, the damper 25 reduces or attenuates kinetic energy of the piston 13 and the driver blade 15. A recess 63 is provided in the piston 13, and the connecting portion 62 is disposed in the recess 63. A long hole 64 extending in the direction of the center axis O1 is provided in the connecting portion 62. A piston pin 65 is disposed in the long hole 64, and a long axis of the long hole 64 is greater than an outer diameter of the piston pin 65. A retaining ring 66 is attached to the piston 13, and the retaining ring 66 contacts both end portions of the piston pin 65. The retaining ring 66 prevents the piston pin 65 from coming off from the piston 13. A seal member 67 is attached to an outer peripheral portion of the piston 13, and the seal member 67 seals the space between the piston 13 and the cylinder hole 12*a*. Note that the flange 131 is provided outside a range where the seal member 67 slides on an inner surface of the cylinder 12 in the direction of the center axis O1. The range where the seal member 67 slides on the inner surface of the cylinder 12 means the range where the seal member 67 slides on the inner surface of the cylinder 12 when the piston 13 reciprocates between the top dead center and the bottom dead center.

As described, the driver blade 15 and the piston 13 are connected to each other via the piston pin 65. Therefore, the driver blade 15 can move in the radial direction of the piston 13 with respect to the piston 13. Accordingly, even when force in the radial direction of the cylinder 12 is applied to the driver blade 15, the piston 13 can be prevented from being pressed against the inner surface of the cylinder 12.

In order to fill the compression chamber 45 with compressed air, a filling valve 71 illustrated in FIG. 1 is provided. The filling valve 71 is provided in the bottom wall portion 42 of the accumulator 41. A base end portion of the filling valve 71 is fixed to the bottom wall portion 42 with a nut 72, and a front end portion of the filling valve 71 protrudes below the bottom wall portion 42, that is, toward a cylinder 12 side. A joint portion 73 is provided at a front end portion of the filling valve 71. When the compression chamber 45 is filled with compressed air, a supply port of one of various compressed gas supply means such as a compressor, an inflator, and a gas cylinder is connected to the joint portion 73. The filling valve 71 incorporates a check valve inside. When the supply port of the compressed air supply means is connected to the joint portion 73, the check valve is opened, and the compression chamber 45 is filled with a compressed gas such as compressed air. When the supply port is removed from the joint portion 73, the filling valve 71 is closed by the check valve.

In order to connect the supply port to the joint portion 73 of the filling valve 71, an opening, not illustrated, is provided in the housing 11. When the driving machine 10 is assembled, the compressed air supply means supplies compressed air to the compression chamber 45 by using the filling valve 71. Furthermore, in a case where gas pressure in the compression chamber 45 lowers, compressed air is supplied to the compression chamber 45 by the pressure supply means. In contrast, when the cylinder 12 is taken out from the inside of the housing 11, the check valve incorporated in the filling valve 71 is operated with an operation tool, and the gas in the compression chamber 45 is discharged to the outside. In addition, an operator can manually operate a relief valve 81 to discharge the gas in the compression chamber 45 to the outside of the compression chamber 45.

The relief valve 81 is provided in the bottom wall portion 42 in order to discharge the compressed air in the compression chamber 45 to the outside in a case where pressure in the compression chamber 45 exceeds a set value. This set value is set to the pressure of the compression chamber 45 necessary for driving the fastener 82 having the maximum length to be driven by the driving machine 10.

As illustrated in FIGS. 1 and 2, the filling valve 71 and the relief valve 81 are provided in the bottom wall portion 42 protruding outward in the radial direction of the cylinder 12. Thus, a space below the bottom wall portion 42, that is, a space formed on the cylinder 12 side is used to dispose the filling valve 71 and the relief valve 81. Accordingly, it is possible to prevent a diameter of the cylinder case portion 11*a* from increasing. Especially, as illustrated in FIGS. 1 and 2, when the filling valve 71 and the relief valve 81 are disposed in the space between the handle portion 11*c* and the cylinder 12, since the accumulator 41 is disposed to be shifted toward the handle portion 11*c* with respect to the center axis O1 of the cylinder 12, the space below the compression chamber 45 is effectively used for disposing the filling valve 71 and the relief valve 81 in the space.

The magazine 18 is attached to the nose portion 16 and the connecting portion 11*d*. The fasteners 82 are accommodated side by side in the magazine 18, and the fastener 82 is supplied to the ejection port 17 by spring force.

The reduction gear 36 illustrated in FIG. 1 includes a plurality of sets of planetary gear mechanisms. The plurality of sets of planetary gear mechanisms are arranged in a power transmission path between the input shaft 37*a* and the output shaft 37*b*. In addition, the reduction gear 36 includes a gear case 120, and a plurality of planetary gear mechanisms are accommodated in the gear case 120. The rotary force of the electric motor 33 is transmitted to the rotary disc 26 via the reduction gear 36.

Next, a control system of the driving machine 10 will be described briefly. A wheel angle detection switch is provided for detecting the rotation angle of the rotary disc 26. A push rod switch is provided for detecting a position of the push rod 54 and outputting a signal. A phase detection sensor is provided for detecting a rotation angle and the number of revolutions of the motor shaft 34. Signals from the above switches and sensor are input to the controller 58, and the controller 58 controls stop, rotation, and rotation speed of the motor shaft 34 of the electric motor 33.

States of the driving machine 10 will be sequentially described.

(State in which Driving Machine is not Used)

Figure 9:
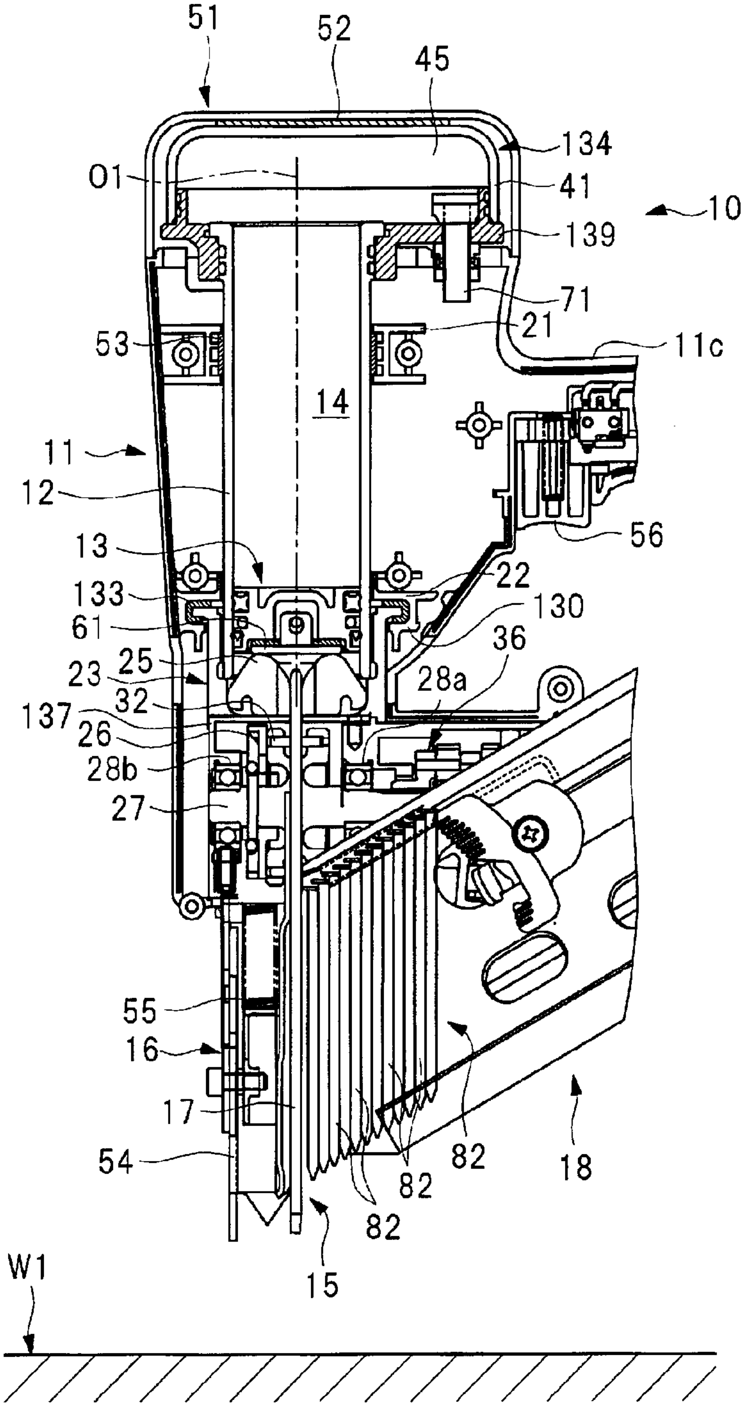
FIG. 9 is a cross-sectional view illustrating a non-use state and a driving completion state of the driving machine illustrated in FIG. 1.

A state in which the driving machine 10 is not used is a state where the push rod 54 is separated from the workpiece and operating force of the trigger 56 is released. The controller 58 stops the electric motor 33 when the driving machine 10 is in this non-used state described above. That is, the piston 13 is pushed toward the damper 25 by air pressure of the compression chamber 45, and as illustrated in FIG. 9, the flange 61 is pressed against the damper 25, whereby the piston 13 and the driver blade 15 are stopped.

In a case where the push rod 54 is separated from a workpiece W1 and the operating force of the trigger 56 is released, the cylinder 12 does not receive a load in the direction crossing the center axis O1. In addition, the vibration damping rubber 53 is pressed against the outer peripheral surface of the cylinder 12 and is elastically deformed. That is, the vibration damping rubber 53 has a predetermined tightening allowance in the radial direction of the cylinder 12. Furthermore, the vibration damping rubber 133 is elastically deformed by being sandwiched between the flange 131 and the inner surface of the support groove 132. That is, the vibration damping rubber 133 has a predetermined tightening allowance in the radial direction of the cylinder 12.

Furthermore, in a case where the push rod 54 is separated from the workpiece W1 and the operating force of the trigger 56 is released, the vibration damping rubber 133 is sandwiched between the flange 131 and the protruding portions 22 and 130 and is elastically deformed. That is, the vibration damping rubber 133 has a predetermined tightening allowance in the direction of the center axis O1.

(Operation of Pressing Push Rod Against Workpiece)

Figure 10:
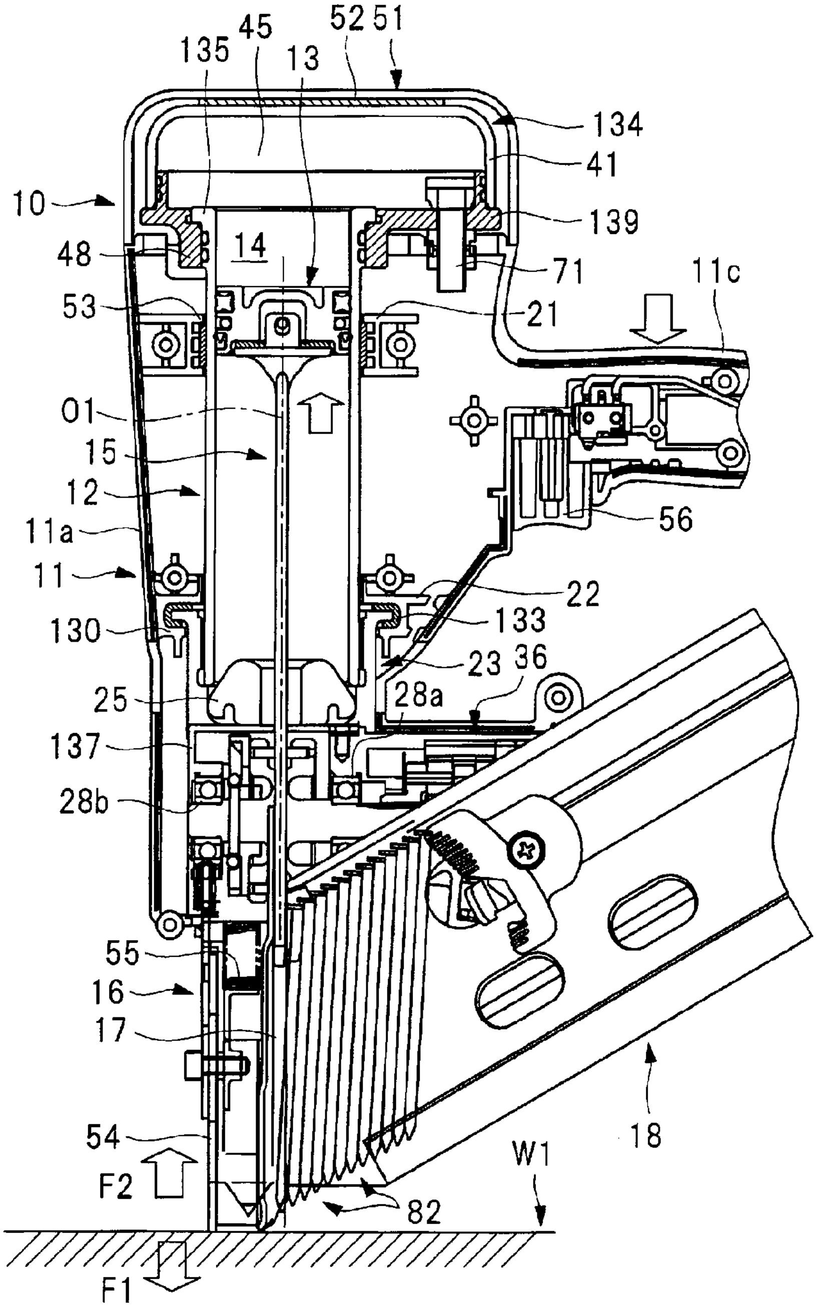
FIG. 10 is a cross-sectional view illustrating a state where a push rod of the driving machine illustrated in FIG. 1 is pressed against a workpiece.

When an operator holds the handle portion 11*c* by hand and presses the push rod 54 against the workpiece W1 with a load F1 in the direction of the center axis O1 as illustrated in FIG. 10, reaction force F2 against the load F1 is generated. The reaction force F2 is transmitted to the holder 23 via the compression coil spring 55 and the nose portion 16. The reaction force F2 and the load F1 act in opposite directions. As illustrated in FIG. 7, the reaction force F2 is transmitted to the vibration damping rubber 133 via the flange 131 of the holder 23. The vibration damping rubber 133 is elastically deformed, whereby the reaction force F2 transmitted to the handle portion 11*c* is reduced. In addition, the holder 23 and the cylinder 12 receive the reaction force F2 and move by a predetermined amount in the direction of the center axis O1 with respect to the housing 11. In addition, frictional force is generated between the outer peripheral surface of the cylinder 12 and the vibration damping rubber 53.

In contrast, in a case where the push rod 54 is pressed against the workpiece W1 in a direction inclined with respect to the center axis O1, a load in the direction crossing the center axis O1 acts on the cylinder 12. The load applied to the cylinder 12 in the direction crossing the center axis O1 includes a load in the radial direction of the cylinder 12. When the cylinder 12 receives the load in the direction crossing the center axis O1, the vibration damping rubbers 53 and 133 are elastically deformed, and the load received by the cylinder 12 is reduced. Note that an inner diameter of the protruding portion 21 is greater than the outer diameter of the cylinder 12, and a gap is set between the outer peripheral surface of the cylinder 12 and the protruding portion 21. The gap is set to a value such that the outer peripheral surface of the cylinder 12 does not contact the protruding portion 21 even if the cylinder 12 moves in the radial direction with respect to the housing 11 and the vibration damping rubber 53 is elastically deformed.

Furthermore, the controller 58 rotates the electric motor 33 when the push rod 54 is pressed against the workpiece W1 and operating force is applied to the trigger 56. The rotary force of the electric motor 33 is transmitted to the rotary disc 26 via the reduction gear 36. When the rotary disc 26 rotates in the counterclockwise direction in FIG. 3 and the pin 32 meshes with the rack 31, the driver blade 15 rises from the bottom dead center to the top dead center as illustrated in FIG. 10, and the air pressure in the compression chamber 45 rises.

(In Driving of Fastener)

Figure 11:
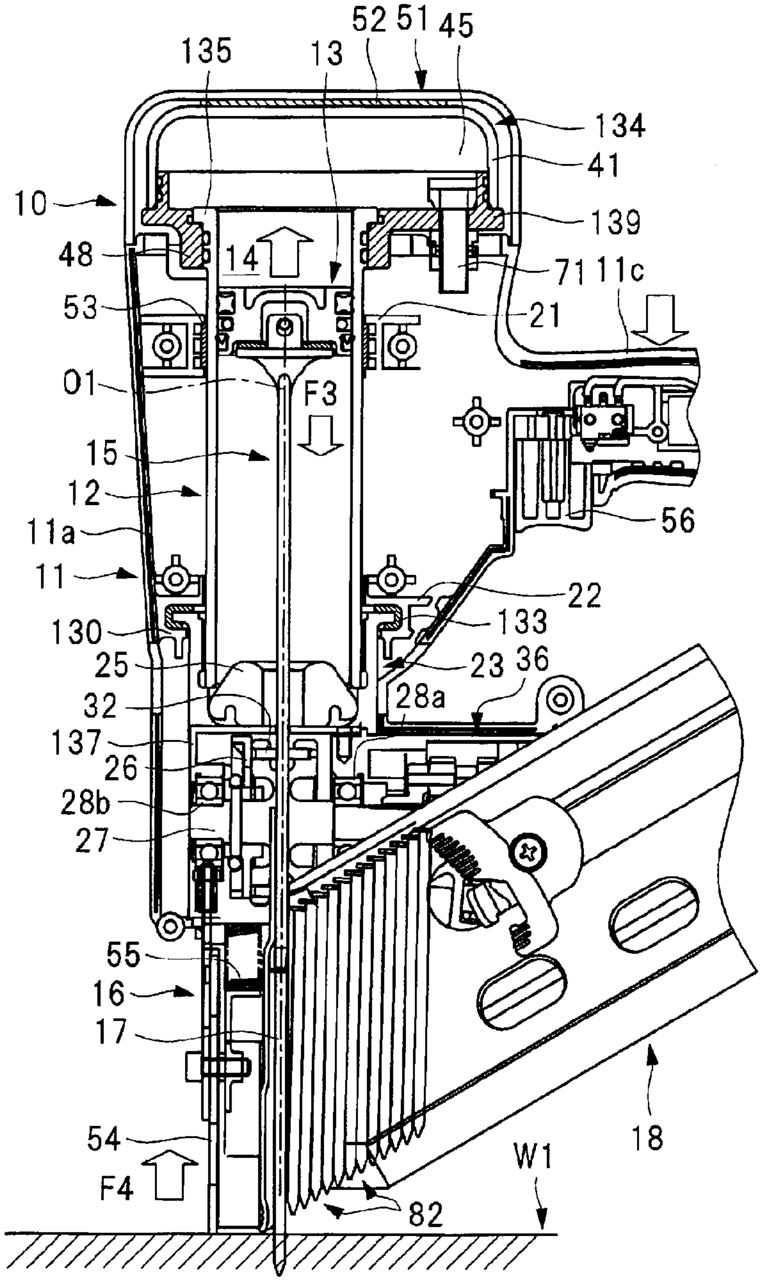
FIG. 11 is a cross-sectional view illustrating a state where the fastener is driven into the workpiece by the driving machine illustrated in FIG. 1.

After the driver blade 15 has moved due to the rotary force of the electric motor 33 and the driver blade 15 has reached the top dead center as illustrated in FIG. 4, the pin 32 is separated from the rack 31. Then, the driver blade 15 moves in the direction of the center axis O1 from the top dead center to the bottom dead center due to the air pressure of the compression chamber 45. Then, the driver blade 15 collides with the fastener 82 located at the ejection port 17, and the driver blade 15 drives the fastener 82 into the workpiece W1 as illustrated in FIG. 11.

When the driver blade 15 drives the fastener 82 with a load F3, reaction force F4 against the load F3 is transmitted to the driver blade 15 and the piston 13. In addition, part of the reaction force F4 is transmitted to the holder 23 via the nose portion 16. The direction of the reaction force F4 is opposite to the direction of the load F3.

Therefore, when the driver blade 15 hits the fastener 82, the holder 23 receives part of the reaction force F4 in the direction of the center axis O1. Therefore, the holder 23 receives a load in the direction of the center axis O1, and the vibration damping rubber 133 is elastically deformed. Thus, the load is absorbed and relieved, and the cylinder 12 is kept positioned relative to the housing 11 in the direction of the center axis O1.

Figure 6:
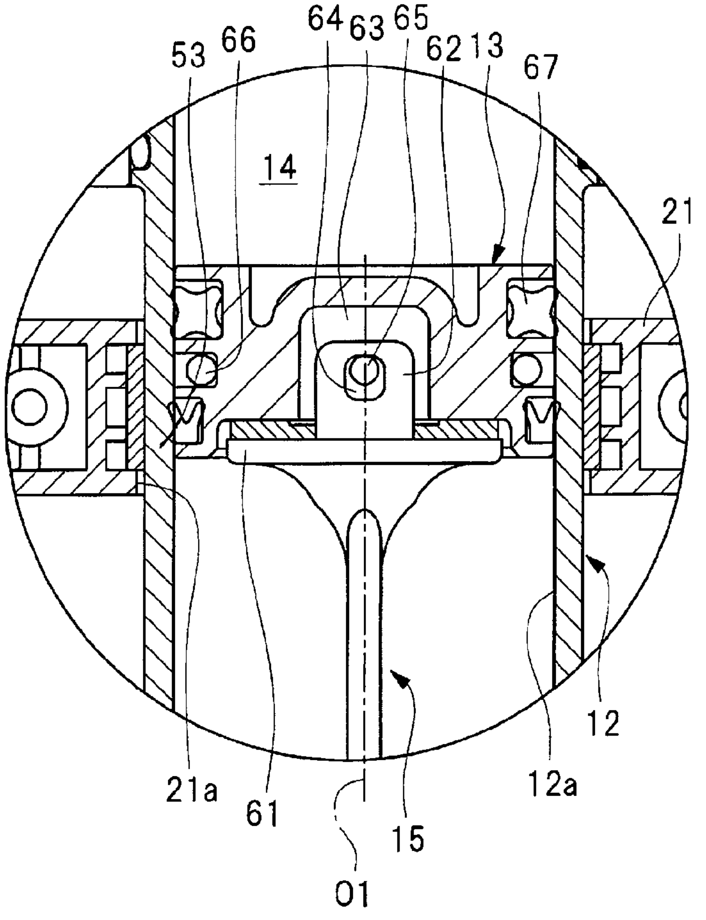
FIG. 6 is a cross-sectional view of a support structure of a cylinder provided in the driving machine illustrated in FIG. 1.

Since this impact is received by the flange 131 provided on the holder 23, a load that causes deformation of the portion of the cylinder 12 on which the seal member 67 slides in FIG. 6, is not applied. Therefore, air leakage due to deformation of the cylinder 12 does not occur. In addition, since it is unnecessary to consider deformation of the cylinder 12 due to the impact force, it is possible to reduce a thickness of the cylinder 12, and thus, a weight of the cylinder 12 can be reduced. In addition, in the above embodiment, the cylinder 12 and the holder 23 are separate components, and the cylinder 12 and the holder 23 are fixed to each other. However, even if the cylinder 12 and the holder 23 are configured to have an integrated structure, a similar effect can be obtained. The integrated structure of the cylinder 12 and the holder 23 means that the cylinder 12 and the holder 23 are configured to be a single component or are integrally formed.

In addition, when the holder 23 receives the load in the direction of the center axis O1, frictional force is generated between the outer peripheral surface of the cylinder 12 and the vibration damping rubber 53. Therefore, the cylinder 12 receives a load in the direction of the center axis O1 at only one spot in the direction of the center axis O1, that is, only at a screw-fixing spot between the cylinder 12 and the holder 23. That is, the cylinder 12 hardly receives a compression load or a tensile load in the direction of the center axis O1.

In addition, when the driver blade 15 drives the fastener 82 into the workpiece W1, the driver blade 15 descends with excessive kinetic energy, and the flange 61 collides with the damper 25. Here, part of the kinetic energy of the driver blade 15 and the piston 13 is absorbed by the damper 25. However, the remaining kinetic energy unable to be absorbed by the damper 25 is transmitted to the holder 23. That is, the holder 23 receives a load F5 in the direction of the center axis O1 illustrated in FIG. 7. The direction of the load F5 is identical to the direction of the load F3 illustrated in FIG. 11. When the holder 23 receives the load F5, the vibration damping rubber 133 is elastically deformed. Thus, the load F5 received by the holder 23 is absorbed and relieved.

Furthermore, when the holder 23 receives the load F5 in the direction of the center axis O1, frictional force is generated between the outer peripheral surface of the cylinder 12 and the vibration damping rubber 53. Therefore, even if the cylinder 12 receives a load in the direction of the center axis O1, the load acts on only one spot in the direction of the center axis O1, that is, only the spot connected to the holder 23. That is, the cylinder 12 hardly receives a compression load or a tensile load in the direction of the center axis O1.

Note that, when the fastener 82 is driven into the workpiece W1 and is stopped, the driving machine 10 floats up due to reaction force applied to the driver blade 15 as illustrated in FIG. 9, the push rod 54 separates from the workpiece W1, and the push rod 54 is returned to the original position by force of the compression coil spring 55. Furthermore, the driver blade 15 separates from the fastener 82.

As described above, in a case where the push rod 54 is pressed against the workpiece W1 or in a case where the fastener 82 is driven into the workpiece W1 by the driver blade 15, the reaction force and the load in the direction of the center axis O1 acting on the holder 23 are received by the housing 11 via the vibration damping rubber 133 without being received by the cylinder 12. Therefore, it is possible to prevent the cylinder 12 from receiving the compression load or the tensile load in the direction of the center axis O1. In addition, a load in the radial direction applied to the cylinder 12 is absorbed or relieved by the vibration damping rubber 53 and 133. Therefore, strength design of the housing 11 that holds the cylinder 12 is facilitated, and it is possible to reduce a size or a weight of the driving machine 10. In addition, it is possible to relieve the impact load transmitted to the handle portion 11*c* which an operator holds by hand, so that the driving machine 10 with a good feeling of use can be provided.

Furthermore, the accumulator 41 and the cover 51 are connected by the connecting elements 136 as illustrated in FIG. 8. When the pressure in the compression chamber 45 rises, the top wall portion 43 receives the pressure, and the main body 134 receives a load F6 in a direction away from the protruding portion 21 in the direction of the center axis O1. Then, part of the load F6 is transmitted to the cover 51 via the vibration damping rubber 52. The cover 51 is pushed away from the protruding portion 21 in the direction of the center axis O1, and moving force of the cover 51 is transmitted to the holder 139 via the connecting elements 136. Then, the protruding portion 48 is engaged with the flange 135. In this manner, the accumulator 41 is positioned in the direction of the center axis O1.

Furthermore, a case will be described where an object contacts the cover 51 and the cover 51 receives a load F7 in the direction of the center axis O1. The direction of the load F7 is opposite to the direction of the load F6. When the cover 51 receives the load F7, the vibration damping rubber 52 is elastically deformed. Thus, the impact is absorbed and relieved. In addition, when part of the load F7 is transmitted to the main body 134 via the vibration damping rubber 52, the main body 134 moves toward the protruding portion 21 in the direction of the center axis O1. Moving force of the main body 134 is transmitted to the holder 139, and the holder 139 moves toward the protruding portion 21 in the direction of the center axis O1. Therefore, it is possible to prevent the cylinder 12 from receiving the load in the direction of the center axis O1. When the accumulator 41 approaches the protruding portion 21 in the direction of the center axis O1, the cylindrical portion 51*a* and the cylinder case portion 11*a* contact each other, and the housing 11 receives a load. Furthermore, impact in driving does not cause the top wall portion 43 of the accumulator 41 to collide with the cover 51, and damage of the cover 51 caused by the impact can be prevented.

Figure 12:
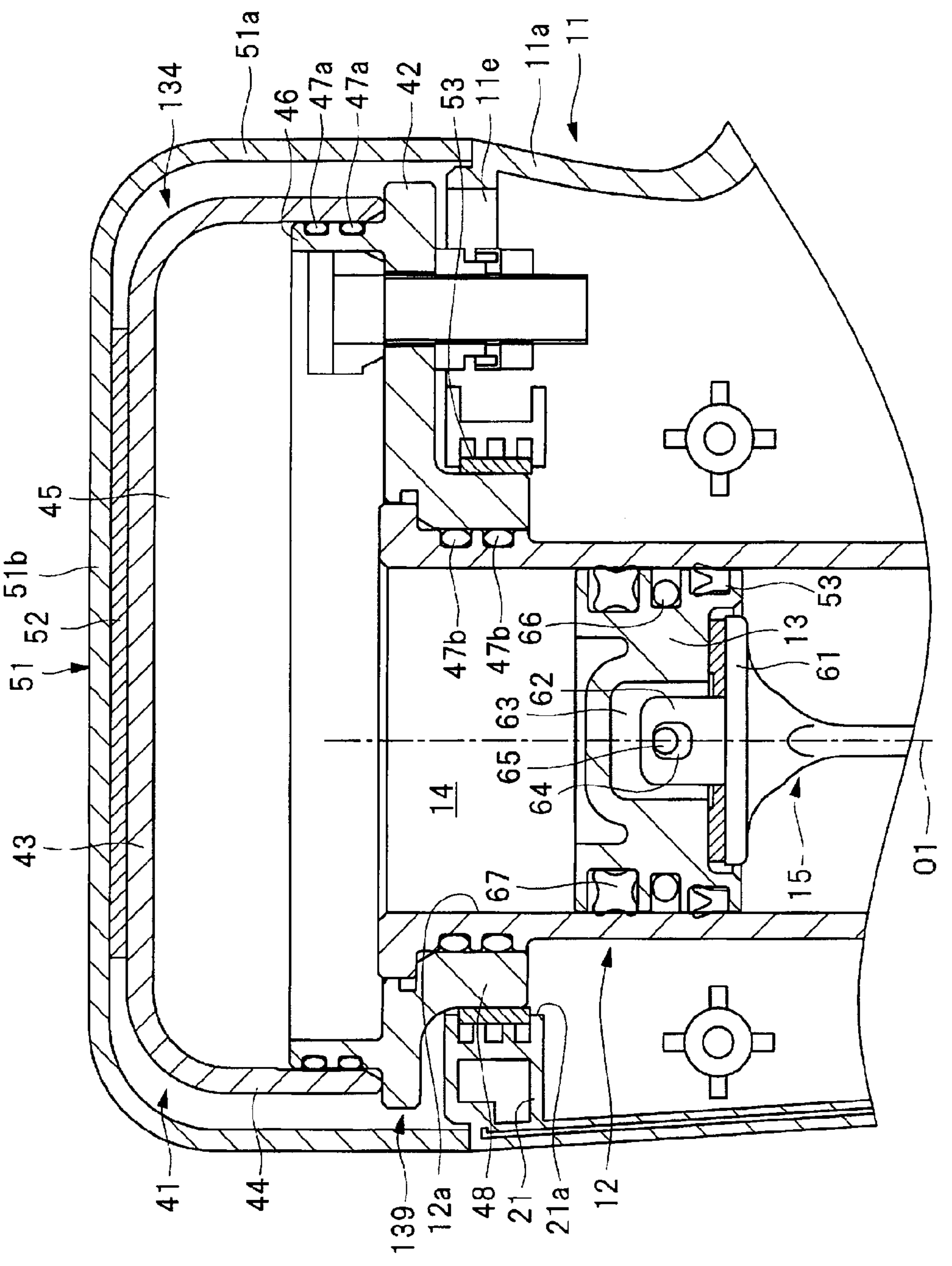
FIG. 12 is a cross-sectional view illustrating another example of the support structure provided in the driving machine illustrated in FIG. 1.

Next, another example of the structure in which the housing 11 supports the cylinder 12 in the direction crossing the center axis O1 will be described with reference to FIG. 12. A range where the protruding portion 21 is disposed overlaps with a range where the protruding portion 48 is disposed in the direction of the center axis O1. The inner diameter of the protruding portion 21 is greater than the outer diameter of the protruding portion 48, and the vibration damping rubber 53 is provided on an inner periphery of the protruding portion 21. The vibration damping rubber 53 is pressed against an outer peripheral surface of the protruding portion 48 and is elastically deformed. When the cylinder 12 receives a load in the direction crossing the center axis O1, the load is transmitted to the vibration damping rubber 53 via the holder 139. The vibration damping rubber 53 is elastically deformed to absorb and relax the load. Furthermore, when the cylinder 12 vibrates in the direction of the center axis O1 together with the holder 23, frictional force is generated at a contact spot between the seal member 47*b* and the protruding portion 48 or a contact spot between the protruding portion 48 and the vibration damping rubber 53.

Here, the correspondence between the configuration described in the present embodiment and the configuration of the present invention will be described. The piston 13 is an operating member of the present invention. The driver blade 15 is a striker of the present invention. The cylinder 12 is a guide member of the present invention. The holder 23 is a holder of the present invention. The vibration damping rubber 133 is a first buffer of the present invention. The vibration damping rubber 53 is a second buffer of the present invention. The opening 11*e* is an opening of the present invention. The vibration damping rubber 52 is a third buffer of the present invention. The protruding portion 48 is a protruding portion of the present invention. The protruding portion 21 is a supporting portion of the present invention. The electric motor 33 is a motor of the present invention. The pin 32 is a pinion of the present invention. The rotary disc 26 is a rotary body of the present invention. The rotary disc 26, the rack 31, the reduction gear 36, and the drive shaft 27 constitute a power conversion mechanism of the present invention. The top portion 140 is a first end portion of the present invention. The front end portion 141 is a second end portion of the present invention.

The driving machine of the present invention is not to be limited to the above embodiment and may be modified in various ways within a scope not deviating from the gist thereof. For example, the driving machine of the present invention may be a driving machine including a compression chamber formed in a bellows, an operating member fixed to an end portion of the bellows, and a cylinder supporting the operating member such that the operating member is movable. Furthermore, the driving machine of the present invention may have a structure in which the operating member is operated by elastic force of a spring. Examples of the spring include a metal spring. Furthermore, examples of the guide member of the present invention include, in addition to the cylinder, a linear rail guiding operation of the operating member, and a linear frame. Examples of the power conversion mechanism of the present invention for moving the operating member from the damper toward the compression chamber include a pulley and a wire in addition to a rack and pinion mechanism. That is, examples of the power conversion mechanism include a structure in which the operating member is operated by pulling force of the wire.

Furthermore, examples of the electric motor described in the embodiment include a DC motor (DC inverter motor) using a battery, which is a DC power supply, as a power source, and a motor (AC inverter motor) using an AC power supply. Furthermore, in lieu of the battery, an AC-DC converter converting an AC power supply to a DC power supply may be used to convert a commercial power supply (AC power supply) to a DC power supply and supply power to the DC motor (DC inverter motor) in the driving machine. Furthermore, as the motor, any of a hydraulic motor, a pneumatic motor, and an internal combustion engine may be used in lieu of the electric motor.

EXPLANATION OF REFERENCE CHARACTERS

10 . . . driving machine, 11 . . . housing, 11*e* . . . opening, 12 . . . cylinder, 13 . . . piston, 15 . . . driver blade, 21, 48 . . . protruding portion, 23 . . . holder, 25 . . . damper, 26 . . . rotary disc, 27 . . . drive shaft, 31 . . . rack, 32 . . . pin, 33 . . . electric motor, 36 . . . reduction gear, 45 . . . compression chamber, 52, 53, 133 . . . vibration damping rubber, 140, 141 . . . end portion, O1 . . . center axis.

What is claimed is:

1. A driver comprising:

a housing;

a piston operable to travel in a traveling direction;

a rack connected to the piston, the rack comprising first engaging parts disposed along the traveling direction of the piston, a rotary component including second engaging parts disposed along a rotating direction of the rotary component, the second engaging parts engaging with the first engaging parts;

a damper configured to absorb a kinetic energy of the piston; and an integrally-formed holder having a damper retaining part supporting the damper and a cylindrical accommodating part covering an outer peripheral surface of the rotary component.

2. The driver according to claim 1, wherein the cylindrical accommodating part has an opening part radially outward of the rotary component, and wherein each of the first engaging parts faces the opening part of the cylindrical accommodating part.

3. The driver according to claim 2, further comprising a drive shaft coupled to the rotary component, wherein the drive shaft is elongated in a first elongating direction crossing the traveling direction of the piston.

4. The driver according to claim 3, wherein each of the first engaging parts is elongated in a second elongating direction crossing the traveling direction of the piston and the first elongating direction, and wherein a tip of each first engaging part faces the opening part of the cylindrical accommodating part.

5. The driver according to claim 3, further comprising a motor configured to drive the drive shaft, wherein the driver further comprises a bearing that is disposed at a side of the rotary component away from the motor in the first elongating direction and supports the drive shaft, and wherein the cylindrical accommodating part supports the bearing.

6. The driver according to claim 1, further comprising a striker connected to the piston and operable to apply driving force to a fastener, wherein the rack is provided on the striker.

7. The driver according to claim 1, further comprising a cylinder having a first side and a second side opposite the first side, wherein the second side of the cylinder is screw-coupled with the integrally-formed holder, and wherein the piston is disposed in the cylinder.

8. The driver according to claim 7, wherein the integrally-formed holder further has a cylindrical part that has an inner peripheral surface on which a female thread is formed, wherein the second side of the cylinder has an outer peripheral surface on which a male thread is formed, and wherein the second side of the cylinder is screw-coupled with the cylindrical part of the integrally-formed holder.

9. The driver according to claim 7, further comprising:

a pressure accumulating container having an upper wall and a cylindrical protrusion connected to the first side of the cylinder; and a sealing member disposed between the cylindrical protrusion and the first side of the cylinder.

10. The driver according to claim 9, wherein the cylindrical protrusion of the pressure accumulating container has a cylindrical shape, wherein the first side of the cylinder has a cylindrical shape, and wherein engaging the pressure accumulating container with the cylinder in an axial direction of the cylinder determines a relative position of the pressure accumulating container and the cylinder along the axial direction.

11. The driver according to claim 9, further comprising a joint configured to connect an external gas source, the joint being disposed on the pressure accumulating container.

12. The driver according to claim 11, wherein a location of the pressure accumulating container at which the joint is disposed is offset from a center axis of the cylinder.

13. The driver according to claim 11, wherein the housing comprises separatable pieces that cover a part of the cylinder, and wherein the housing has an opening that allows external access to the joint.

14. The driver according to claim 11, further comprising a relief valve, disposed on the pressure accumulating container, configured to discharge a gas outside of the pressure accumulating container when the gas reaches a predetermined pressure.

15. The driver according to claim 9, wherein a portion of the pressure accumulating container extends in one direction along a radial axis of the cylinder, relative to a center of the cylinder.

16. The driver according to claim 9, further comprising a protrusion disposed on an inner surface of the housing, the protrusion supporting a location of the pressure accumulating container, the location being closer to a center of the cylinder than an outermost periphery of the pressure accumulating container.

17. The driver according to claim 1, wherein the integrally-formed holder further has a cylindrical part, wherein the cylindrical part has a connection portion extending from an outer peripheral surface of the cylindrical part, and wherein the integrally-formed holder is accommodated in the housing with which the connection portion is engaged.

18. The driver according to claim 1, further comprising a first damping element disposed between the integrally-formed holder and the housing.

19. The driver according to claim 18, further comprising:

a cylinder having a first side and a second side opposite the first side; and a pressure accumulating container disposed at the first side of the cylinder, and a second damping element disposed between the pressure accumulating container and the housing.

20. The driver according to claim 19, wherein the housing including a cylinder case portion surrounding a radially outer side of the cylinder and having an opening at a first end of the cylinder case portion, and a cup-shaped cover that is disposed to face the opening, and wherein the second damping element disposed between the pressure accumulating container and the cup-shaped cover.

21. The driver according to claim 20, further comprising a third damping element disposed inside the cylinder case portion separately from the first damping element.

22. A driver comprising:

a cylinder having a first side and a second side opposite the first side;

a piston disposed in the cylinder and operable to travel in a first direction from the first side toward the second side, and in a second direction opposite the first direction;

a striker connected to the piston and operable to apply driving force to a fastener;

a damper configured to absorb a kinetic energy of the piston;

a holder including a damper retaining part supporting the damper; and a pressure accumulating container having an upper wall and a joint part to which an external gas source is connected, wherein the pressure accumulating container is connected to the first side of the cylinder, and wherein the second side of the cylinder and the holder are screw-coupled together in a direction of a center axis of the cylinder.

23. The driver according to claim 22, wherein a location of the pressure accumulating container at which the joint part is disposed is offset from the center axis of the cylinder.

24. The driver according to claim 22, wherein the pressure accumulating container includes at least two components that forms a part of the compression chamber, and wherein one of the at least two components has the joint part.

25. The driver according to claim 22, further comprising a housing accommodating the cylinder, the holder, and the pressure accumulating container, and wherein the housing has an opening that allows external access to the joint.

* * * * *